United States Patent

[11] 3,591,196

| [72] | Inventor | Henry J. Ott<br>Old William Penn Hwy., Murrysville, Pa. 15668 |
|---|---|---|
| [21] | Appl. No. | 778,127 |
| [22] | Filed | Nov. 22, 1968 |
| [45] | Patented | July 6, 1971 |

[54] VELOCIPEDE WITH ROCKING SEAT
6 Claims, 6 Drawing Figs.

| [52] | U.S. Cl. | 280/1.195 |
|---|---|---|
| [51] | Int. Cl. | A63g 17/00 |
| [50] | Field of Search | 280/1.195, 1.196 |

[56] References Cited
UNITED STATES PATENTS

| 543,874 | 8/1895 | Latty | 280/1.196 X |
|---|---|---|---|
| 671,029 | 4/1901 | Piper | 280/1.195 |
| 1,345,127 | 6/1920 | Capp | 280/1.196 X |
| 2,518,899 | 8/1950 | Kelleher | 280/1.195 |
| 2,796,265 | 6/1957 | Fields et al. | 280/1.195 |
| 3,051,501 | 8/1962 | Bunn | 280/1.195 X |

*Primary Examiner*—Leo Friaglia
*Attorney*—Clement L. McHale

ABSTRACT: A velocipede of the tricycle type is disclosed including means for imparting a rocking motion to the seat on which the rider is disposed as the velocipede is propelled by the rider.

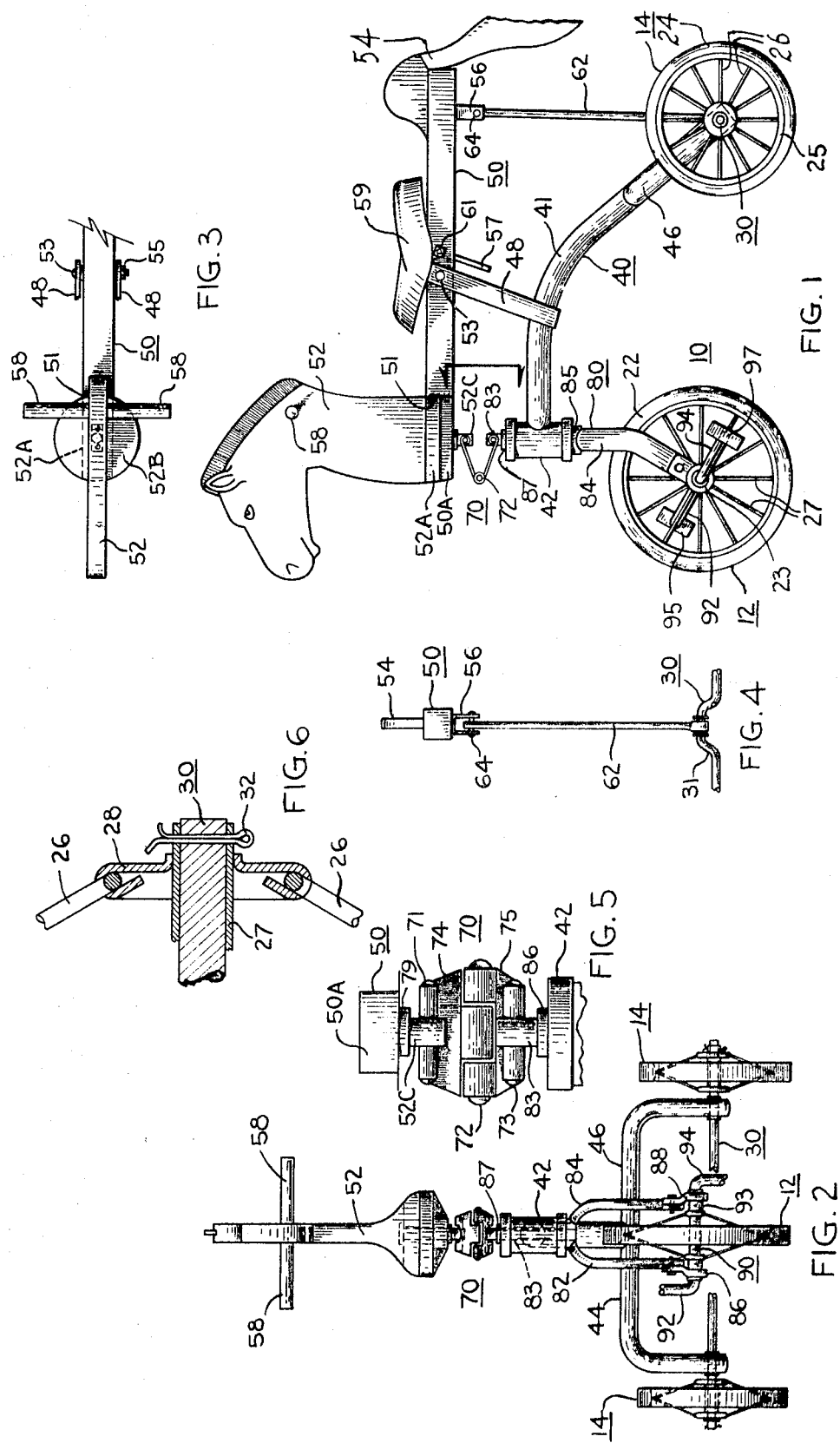

VELOCIPEDE WITH ROCKING SEAT

It is an object of this invention to provide a new and improved velocipede of the tricycle type.

Another object of this invention is to provide an improved means for actuating the movement and steering of a velocipede.

Other objects will, in part, be obvious and will, in part, appear hereinafter.

For a further understanding of the nature and objects of my invention, reference may be had to the following detailed description taken in conjunction with the accompanying drawings, in which:

FIG. 1 is a side elevational view of a velocipede embodying the principal features of my invention;

FIG. 2 is a front view of the velocipede shown in FIG. 1 with certain parts cut away;

FIG. 3 is a partial plan view of the velocipede shown in FIG. 1;

FIG. 4 is a partial rear view of the velocipede shown in FIG. 1;

FIG. 5 is an enlarged fragmentary view of a hinge means which forms part of the velocipede shown in FIG. 1; and FIG. 6 is an enlarged fragmentary view of one of the rear wheels of the velocipede shown in FIG. 1.

Referring now to the drawings and FIGS. 1 and 2 in particular, there is illustrated a velocipede 10 embodying the teachings of the invention. The velocipede 10 includes a frame 40, a steering fork 80, a pair of rear wheels 14 mounted on the rear axle 30, a single front wheel 12, an elongated member 50 rotatably supported on said frame, a seat member 55, a steering member 52, a hinge means 70 operatively connecting the steering member 52 and the steering fork 80 and a connecting means 62 for pivotally connecting said elongated member and said rear axle.

The frame 40 includes a generally arcuate central portion 41 and a pair of laterally spaced leg portions 44 and 46 which extend in opposite directions outwardly from one end of the central portion 41 and downwardly, as shown in FIGS. 1 and 2. The rear axle 30 extends between and through aligned openings provided in the leg portions 44 and 46 and includes a crank portion 31 intermediate said leg portions for reasons which will be explained hereinafter. A tubular member 42 is rigidly secured to the front end of the central portion 41 of the frame 40 by suitable means, such as welding, and is adapted to rotatably receive the upper end of the steering fork 80. It is to be noted that the different portions of the frame 40 may be formed from tubular material or pipe, such as galvanized steel, which may be approximately one inch in diameter. A generally U-shaped bracket 48 is rigidly secured to the central portion 41 of the frame 40 by any suitable means, such as welding, and projects generally upwardly therefrom to rotatably support the elongated member 50. The bracket 48 may be formed from flat strap material, such as cold rolled steel, which is approximately 1 inch wide and one-eighth inch thick.

The rear wheels 14 may be rotatably mounted in spaced relation at the opposite ends of the rear axle 30 in any suitable manner outwardly of the leg portions 44 and 46 of the frame 40. As best shown in FIGS. 1 and 6, the rear wheels 14 may be of any conventional type. As illustrated, the rear wheels 14 may be of the type which includes a central hub portion 28, a plurality of radial spokes 26 extending between said hub portion and an outer rim 25, and a tire 24 which is mounted on the outer rim 25 and which may be formed from an elastomeric material, such as rubber. The shaft 30 passes through a central tubular or sleeve portion 27 of each rear wheel 14 with the hub portion 28 of each rear wheel 14 being rigidly secured to the associated tubular portion 27 by suitable means, such as welding. As shown in FIG. 6, one of the rear wheels 14 is fixed or locked on the rear axle 30 for rotation therewith by suitable means, such as the cotter pin 32 which passes transversely through aligned openings provided in the tubular portion 27 of the rear wheel 14 shown at the rear axle 30. Alternatively, it is to be understood that one of the rear wheels 14 may, instead, be rigidly secured to the rear axle by welding, brazing or soldering or the tubular portion 27 of one of the rear wheels 14 may be square or polygonal in form with the end of the rear axle 30 on which the modified rear wheel is disposed having a corresponding or similar cross-sectional shape to prevent rotation of one of the rear wheels 14 with respect to the rear axle or shaft 30. The other rear wheel 14, as best shown in FIG. 2, should be mounted on the other end of the rear axle 30 so as to be free to rotate with respect to the axle 30 in order to permit proper turning or steering movements of the velocipede 10. In particular, a cotter pin may be provided which passes only through a transverse opening in the rear axle 30 outwardly of the adjacent rear wheel 14 and not the tubular portion 27 of the adjacent rear wheel 14.

The front wheel 12 is fixed or locked on a crank axle 90 for rotation therewith. The crank axle 90 passes through aligned openings in and is rotatably supported by a pair of laterally spaced lugs or brackets 86 and 88 which, in turn, are mounted on and secured to the lower ends of the fork arms 82 and 84, respectively, of the steering fork 80 by suitable means, such as bolts or welding. The front wheel 12 may be locked on the central portion 93 of the crank axle 90 by providing a square or polygonal hole in the hub portion 23 of the front wheel and an intermediate portion of the central portion 93 of the crank axle 90 having a similar or corresponding cross section. It is to be noted that the front wheel 12 may be of any conventional type and, as illustrated, includes a central hub portion 23, an outer rim 22, a plurality of spokes 27 extending radially between said hub portion and said outer rim, and a tire made from an elastomeric material, such as rubber disposed on the outer rim 22.

In order to propel the velocipede 10, the crank axle 90 is provided with the crank arms 92 and 94 at the opposite sides thereof with each crank arm having a horizontally extending portion on which one of the foot pedals 95 and 97 is rotatably supported in a conventional manner. The crank arms 92 and 94 extend transversely away from the central portion 93 of the crank axle 90 in diametrically opposite directions. It is to be noted that the fork arms 82 and 84 and the associated lugs or brackets 86 and 88, respectively, are spaced laterally out of engagement with the hub portion 23 of the front wheel 12 and the square or polygonal portion of the crank axle to minimize the frictional resistance to rotation of the front wheel 12 when torque is applied to the crank axle 90 by pushing the front pedals 95 and 97.

The upper shaft portion 83 of the steering fork 80 passes through and is rotatably supported by the tubular member 42. In order to retain the steering fork 80 in assembled relation with the tubular member 42 and the frame 40, the steering fork 80 may include an enlarged portion or shoulder portion 85 which bears against the lower end of the tubular member 42 and a retaining ring or nut 87 may be disposed on the upper shaft portion 83 of the steering fork 80 adjacent to the upper end of the tubular member 42.

As previously mentioned, the elongated member is rotatably or pivotally supported on the frame 40 by the generally U-shaped bracket 48. As best shown in FIG. 1, the elongated member 50 extends rearwardly from a point which is above and spaced from the upper end of the steering fork 80 to a point which is directly above and spaced from the rear axle 30. As shown in FIGS. 1 and 3, the elongated member 50 is pivotally supported approximately midway along its length on a pivot pin or bolt 53 which passes through aligned openings in the arms of the bracket 48 and the elongated member 50 which is disposed between the arms of said bracket. A retaining nut 55 may be disposed on one end of the pivot pin or bolt 53 to maintain the parts in assembled relation. A pair of washers or spacers may be disposed between the sides of the elongated member 50 and the arms of the bracket 48 to reduce the frictional forces which would otherwise be present between the elongated member 50 and the arms of the bracket 48.

The seat member 59 is secured to the elongated member 50 for movement or rotation therewith between the pivot pin 53 and the rear end of the elongated member 50. More specifically, a downwardly extending shaft or rod 57 is secured to the underside of the seat member by suitable means and passes through an opening provided in the elongated member 50. The shaft 57 is secured to the elongated member 50 by suitable means such as the nut and bolt means 61 which passes transversely through aligned openings provided in the elongated member 50 and the shaft 57.

In order to impart a rocking or oscillatory movement to the elongated member 50 and, in turn, to the seat member 59 when the velocipede is propelled by the rider, the rear axle 30 is operatively connected to the elongated member 50 adjacent to the rear end thereof which is disposed above said rear axle by the connecting rod 62. More specifically, the lower end of the rod 62 is enlarged and includes an opening through which the crank portion 31 of the rear axle 30 passes to pivotally connect the rear axle 30 to the rod 62. A flanged sleeve bearing member may be disposed between the opening in the rod 62 and the crank portion 31. The upper end of the rod 62 is pivotally connected to a generally U-shaped bracket 56 by a pivot pin 64 which passes through aligned openings provided in the bracket 56 and the rod 62. The bracket 56, in turn, is secured to the underside of the elongated member 50 adjacent to the rear end thereof by suitable means, such as welding or bolts. It is to be noted that a decorative member 54 having the shape of a horse's tail may be secured to the rear end of the elongated member 50, as best shown in FIG. 1.

In order to actuate the steering fork 80 to thereby steer the velocipede 10, a steering member 52 is rotatably supported on top of the front portion of the elongated member 50. As illustrated, the steering member 52 may have the shape of the head of a horse and include a pair of handles 58 which project laterally in opposite directions from the steering member 52. The steering member 52 also includes a downwardly projecting shaft portion 52C which passes through an opening provided in the front portion 50A of the elongated member 50 which, as illustrated, is recessed to receive a generally circular base 52A of the steering member 52. In order to assist in guiding the rotational movement of the steering member 52, the recess in the front portion 50A of the elongated member 50 may be generally arcuate in shape as indicated at 51 in FIG. 3. A retaining ring 79 may be disposed on the downwardly extending shaft portion 52C of the steering member 52 to assist in retaining the steering member 52 in assembled relation with the elongated member 50.

In order to operatively connect or couple the steering member 52 to the steering fork 80 while permitting the rocking or oscillatory movement of the elongated member 50 which is imparted to the elongated member 50 from the rear axle 30, the hinge means 70 is pivotally connected to the shaft portion 52C of the steering member 52 and to the upper shaft portion 83 of the steering fork 80. More specifically, the hinge means 70 includes the first and second hinge parts or plates 74 and 75, respectively, which are pivotally connected by a hinge pin 72 which is disposed generally perpendicular with respect to the axis of rotation of the steering fork 80. The hinge means 70 is pivotally connected to the shaft portion 52C of the steering member 52 by the pivot pin 71 which passes through the aligned openings in a pair of spaced tubular portions mounted at or formed integrally with the first hinge part 74 at the upper edge thereof and a transverse opening in the shaft portion 52C. Similarly, the hinge means 70 is pivotally connected to the upper shaft portion 83 of the steering fork 80 by a pivot pin 73 which passes through aligned openings in a pair of spaced tubular portions mounted at or formed integrally with the second hinge part 75 at the lower edge thereof and a transverse opening in the upper shaft portion 83 of the steering fork 80. It is to be noted that the pivot pins 71 and 73 are disposed substantially parallel to the hinge pin 72 to permit oscillatory movement of the front portion 50A of the elongated member 50 toward and away from the upper shaft portion 83 of the steering fork 80 as the velocipede 10 is propelled by its rider and the rear end of the elongated member 50 is actuated by the rotation of the rear axle 30 through the rod 62. It is to be noted that the maximum movement of the front portion 50A of the elongated member 50 as determined by the dimensions or size of the hinge means 70 must be coordinated with the throw or offset of the crank portion 31 of the rear axle 30 which is preferably limited to approximately three-fourths of an inch to limit the corresponding movements of the steering member 52 and the seat member 59 which might otherwise render the operation of the velocipede 10 unstable or unsafe, depending in part upon the distance between the pivot bolt 53 and the point at which the seat member 59 is mounted on the elongated member 50.

In the operation of the velocipede 10, propulsion of the velocipede is initiated by the rider pressing with his feet on both of the foot pedals 95 and 97 to thereby apply a torque to the crank axle 90 to rotate the front wheel 12 either in a forward or reverse direction. As the velocipede is propelled by the rider in either direction, the rear wheels 14 are actuated to rotate. Since one of the rear wheels 14 is fixed to rotate with the rear axle 30, a torque is also applied to the rear axle 30 to thereby rotate the rear axle 30. As the rear axle 30 rotates, the crank portion 31 of the rear axle 30 also rotates to actuate the connecting rod 62 to exert a torque on the elongated member 50 adjacent to the rear end thereof. The elongated member 50 is thereby actuated to alternately rotate about the axis of rotation as defined by the pivot bolt 53 in clockwise and counterclockwise directions. The elongated member 50 thus is actuated by the propulsion of the velocipede to move between first and second limiting positions about the axis defined by the pivot bolt 53 in rocking or oscillatory movements which to the rider disposed on the seat member 59 which moves with the elongated member 50 simulates to a degree the movement of a rider seated on a horse.

It is to be noted that in the operation of the velocipede 10, the hinge means 70 is provided to permit the rocking movements of the elongated member 50 which are actuated through the rotation of the rear wheels 14 and the rear axle 30.

In order to steer the velocipede 10, the handles 58 on the steering member 52 are grasped by the rider's hands to rotate the steering member 52 in place about the axis defined by the shaft portion 52C. When the steering member 52 is rotated by the rider during the propulsion of the velocipede 10, a torque is transmitted through the hinge means 70 to the steering fork 80 which, in turn, actuate the front wheel 12 to rotate correspondingly to thereby turn the velocipede 10 in the desired direction. As previously mentioned, only one of the rear wheels 14 is secured to the rear axle 30 for rotation therewith to permit turning movements of the velocipede 10.

It is to be noted that during the propulsion of the velocipede 10, the shaft portion 52C moves generally toward and away from the shaft portion 83 of the steering fork 80 while the hinge parts 74 and 75 of the hinge means 70 move correspondingly toward and away from open and closed positions of the hinge means 70 which rotates simultaneously with the steering member 52 whenever the steering member is rotated by the rider to turn the velocipede 10.

It is to be understood that the steering member 52 along with the handles 58 may be formed or cast from a thermosetting or thermoplastic material or resin with a suitable filler and that the front portion 50A of the elongated member 50 may be shaped similarly to the base portion 52B of the steering member 52 to increase the support for the steering member 52.

Since numerous changes may be made in the above-described velocipede and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A velocipede comprising a frame, a steering fork including an upper shaft portion having a transverse opening therethrough pivotally mounted at the front of the frame, a first crank axle rotatably supported on the steering fork, a single front wheel disposed on said crank axle for rotation therewith, a second axle rotatably supported at the rear of the frame and having a central crank portion, two wheels mounted at the opposite ends of said second axle, an elongated member having a seat member disposed thereon and extending from adjacent said steering fork to a point above said second axle, said elongated member being pivotally supported on said frame for rotation about an axis generally parallel to said second axle, a coupling rod pivotally connected at one end to said crank portion of said second axle and at the other end to said elongated member adjacent to one end thereof, a steering member pivotally supported on top of said elongated member adjacent the other end and including a downwardly projecting shaft portion having a transverse opening therethrough, and a hinge member connected between said steering member and said steering fork to permit rotation of said steering fork by said steering member while permitting rocking movement of said elongated member by the rotation of one of said two wheels when said first crank axle is driven, said hinge member comprising first and second hinge plates pivotally connected by a hinge pin, each of said hinge plates including a pair of spaced tubular portions at the edge away from said hinge pin, a first pivot pin for pivotally connecting said first hinge plate to said steering member which passes through the tubular portions thereof and the transverse opening in the shaft portion of said steering member, a second pivot pin for pivotally connecting said second hinge plate to said steering fork which passes through the tubular portions thereof and the transverse opening in the shaft portion of said steering fork.

2. The combination as claimed in claim 1 wherein said steering member is shaped as the head of a horse with handles projecting laterally therefrom.

3. The combination as claimed in claim 1 wherein a member shaped like the tail of a horse is disposed at the rear of the elongated member for movement therewith.

4. A velocipede comprising a frame member including a generally arcuate central portion and a pair of laterally spaced leg portions which extend in opposite directions outwardly from one end of said central portion and downwardly, a rear axle extending between and through said leg portions and being rotatably supported by said leg portions, a pair of rear wheels mounted at the opposite ends of said rear axle, one of said rear wheels being secured to said rear axle for rotation therewith a tubular member rigidly secured to the other end of said central portion, a fork member having two spaced arms and a shaft portion having a transverse opening rotatably disposed in and extending through said tubular member, a front axle rotatably supported by the arms of said fork member, a front wheel mounted on said front axle for rotation therewith between said arms, said front axle including a pair of crank portions extending outwardly in opposite directions away from said arms and having foot pedals mounted thereon, a bracket member rigidly secured to and extending generally upwardly from the central portion of said frame member intermediate said front and rear wheels, an elongated member pivotally supported on said bracket member and disposed generally perpendicular to said rear axle, one end of said elongated member being disposed adjacent to and spaced from said tubular member and the other end disposed above and spaced from said rear axle, said rear axle including a crank portion between said leg portions of said frame member, a rod member pivotally connected at one end to said crank portion and pivotally connected at the other end to said elongated member adjacent said other end thereof, a hinge member including first and second hinge plates pivotally connected by a hinge pin disposed generally parallel to said front axle, each of said hinge plates including a pair of spaced tubular portions at the edge away from said hinge pin, a first pivot pin for pivotally connecting said first hinge plate to said fork member which passes through the tubular portions of said first hinge plate and the transverse opening in the shaft portion of said fork member, a steering member rotatably supported on top of said one end of said elongated member and including a shaft portion having a transverse opening passing through said elongated member, a second pivot pin for pivotally connecting said second hinge plate to said steering member which passes through the tubular portions of said second hinge plate and the transverse opening in the shaft portion of said steering member to permit rocking movements of said elongated member as said crank portion of said rear axle rotates, and a seat member mounted on said elongated member for movement therewith.

5. The combination as claimed in claim 4 wherein the steering member has the configuration of the head of a horse with handles projecting laterally therefrom.

6. The combination as claimed in claim 4 wherein a member shaped like the tail of a horse is disposed at the rear of the elongated member for movement therewith.